United States Patent
Nakamura et al.

(10) Patent No.: US 10,467,079 B2
(45) Date of Patent: Nov. 5, 2019

(54) INFORMATION PROCESSING DEVICE, INFORMATION PROCESSING METHOD, AND NON-TRANSITORY COMPUTER-READABLE STORAGE MEDIUM

(71) Applicant: FUJITSU LIMITED, Kawasaki-shi, Kanagawa (JP)

(72) Inventors: Wataru Nakamura, Fukuoka (JP); Yuta Ohura, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/055,484

(22) Filed: Aug. 6, 2018

(65) Prior Publication Data
US 2019/0050282 A1 Feb. 14, 2019

(30) Foreign Application Priority Data
Aug. 9, 2017 (JP) .................................. 2017-154219

(51) Int. Cl.
G06F 9/455 (2018.01)
G06F 11/07 (2006.01)
G06F 11/28 (2006.01)

(52) U.S. Cl.
CPC ...... *G06F 11/0778* (2013.01); *G06F 11/0721* (2013.01); *G06F 11/0787* (2013.01); *G06F 11/28* (2013.01)

(58) Field of Classification Search
None
See application file for complete search history.

(56) References Cited

U.S. PATENT DOCUMENTS 6,353,902 B1 * 3/2002 Kulatunge ............. H04L 41/06
714/47.3
6,609,212 B1 * 8/2003 Smith ................. G06F 11/2257
714/4.5
(Continued)

FOREIGN PATENT DOCUMENTS

JP 2010-224629 10/2010
WO 2014/118897 8/2014

OTHER PUBLICATIONS

Salfner et al., "Predicting Failures of Computer Systems: A Case Study for a Telecommunication System", IEEE 2006, (Salfner_2006.pdf; pp. 1-8) (Year: 2006).*
(Continued)

*Primary Examiner* — Hiren P Patel
(74) *Attorney, Agent, or Firm* — Fujitsu Patent Center

(57) ABSTRACT

An information processing device including a memory, and a processor coupled to the memory and the processor configured to execute a process, the process including generating data indicating a relationship between a processing load and a communication load of a first computer which executes a specified process in a second information processing system which is the same as or similar to a first information processing system in which a failure occurs, and calculating a processing load of a second computer which executes the specified process in the first information processing system based on the generated data and a communication load of the second computer, the estimated processing load being a processing load before the failure occurs in the first information processing system.

7 Claims, 20 Drawing Sheets

(56) References Cited

U.S. PATENT DOCUMENTS

| | | | | |
|---|---|---|---|---|
| 7,484,132 B2* | 1/2009 | Garbow | ............... | G06F 11/008 714/26 |
| 8,881,108 B2* | 11/2014 | Tran | ................... | G06F 11/3668 370/241 |
| 8,966,039 B1* | 2/2015 | Fultz | ...................... | H04L 67/16 709/223 |
| 10,198,330 B2* | 2/2019 | Boshev | ................ | G06F 11/203 |
| 10,339,131 B1* | 7/2019 | Dolas | ................... | G06F 11/004 |
| 2005/0102674 A1* | 5/2005 | Tameshige | ........... | G06F 9/5011 718/100 |
| 2008/0126881 A1* | 5/2008 | Bruckhaus | ........... | G06F 11/008 714/47.2 |
| 2010/0318837 A1* | 12/2010 | Murphy | ................ | G06F 11/008 714/4.1 |
| 2010/0318856 A1* | 12/2010 | Yoshida | .............. | G05B 23/024 714/47.1 |
| 2014/0298112 A1* | 10/2014 | Otsuka | ................ | G06F 11/3452 714/47.3 |
| 2015/0135012 A1* | 5/2015 | Bhalla | ................... | H04L 41/147 714/26 |
| 2015/0301882 A1* | 10/2015 | Liao | ................... | G05B 19/4184 714/47.3 |
| 2016/0112275 A1* | 4/2016 | Park | ...................... | H04L 41/147 709/224 |
| 2016/0335166 A1* | 11/2016 | George | ............... | G06F 11/2094 |
| 2017/0207952 A1* | 7/2017 | Ogawa | ................. | H04L 41/0677 |

OTHER PUBLICATIONS

S. K. Yang; "A Condition-Based Failure-Prediction and Processing-Scheme for Preventive Maintenance", IEEE, Sep. 2003 (Yang_2003.pdf; pp. 373-383) (Year: 2003).*

* cited by examiner

FIG. 6

|  |  | FRONT END | | | | BACK END | | | |
| --- | --- | --- | --- | --- | --- | --- | --- | --- | --- |
|  |  | GET | POST | PUT | DELETE | SELECT | INSERT | UPDATE | DELETE |
| 10:00:01 | NUMBER OF REQUESTS/NUMBER OF COMMANDS | 346.09 | 275.52 | 125.05 | 203.60 | 422.76 | 46.10 | 348.58 | 314.21 |
|  | AMOUNT OF DATA | 17.27 | 381.13 | 275.64 | 130.86 | 165.93 | 170.56 | 498.65 | 375.14 |
| 10:00:01 | NUMBER OF REQUESTS/NUMBER OF COMMANDS | 421.97 | 163.63 | 465.76 | 462.84 | 434.39 | 317.36 | 348.58 | 434.38 |
|  | AMOUNT OF DATA | 19.41 | 265.21 | 488.31 | 326.16 | 198.85 | 446.55 | 167.70 | 435.07 |
| 10:00:01 | NUMBER OF REQUESTS/NUMBER OF COMMANDS | 487.81 | 150.56 | 414.92 | 211.83 | 355.85 | 27.87 | 50.90 | 393.83 |
|  | AMOUNT OF DATA | 164.84 | 211.35 | 463.02 | 275.23 | 68.99 | 352.66 | 348.58 | 278.57 |
| ... | ... | ... | ... | ... | ... | ... | ... | ... | ... |

FIG. 8

| TIME | CPU 0 | CPU 1 | CPU 2 | ... |
|---|---|---|---|---|
| 10:00:01 | 10.90 | 23.69 | 48.00 | ... |
| 10:00:02 | 21.83 | 50.90 | 66.42 | ... |
| 10:00:03 | 45.07 | 80.78 | 46.71 | ... |
| 10:00:04 | 11.51 | 6.71 | 1.07 | ... |
| 10:00:05 | 80.38 | 85.95 | 52.58 | ... |
| ⋮ | ⋮ | ⋮ | ⋮ | ⋮ |

FIG. 10

| SYSTEM | SERVER TYPE | NUMBER OF CPU CORES | MEMORY CAPACITY |
|---|---|---|---|
| SYSTEM 1 | LB | 2 | 1024 |
| | Web | 2 | 2048 |
| | Cache | 1 | 2048 |
| | Storage | 1 | 1024 |
| | App | 3 | 2048 |
| | DB | 3 | 1024 |
| SYSTEM 2 | Web/App | 8 | 8192 |
| | DB | 4 | 4096 |
| SYSTEM 3 | LB | 1 | 512 |
| | Web/App | 1 | 512 |
| | Web/App | 1 | 512 |
| | Web/App | 1 | 512 |
| ⋮ | ⋮ | ⋮ | ⋮ |

FIG. 11

| GROUP | SYSTEM CONFIGURATION | SYSTEM LIST |
|---|---|---|
| GROUP_1 | LB+Cache+THREE LAYERS Web+Storeage | SYSTEM_1, SYSTEM_5, ··· |
| GROUP_2 | TWO LAYERS Web | SYSTEM_2, SYSTEM_10, ··· |
| GROUP_3 | LB+App | SYSTEM_3, ··· |

FIG. 12

| SERVER TYPE | NUMBER OF CPU CORES | MEMORY CAPACITY |
|---|---|---|
| LB | 2 | 1024 |
| Web | 2 | 2048 |
| Cache | 1 | 2048 |
| Storage | 1 | 1024 |
| App | 3 | 2048 |
| DB | 3 | 1024 |

FIG. 13

| AP SERVER | | | FRONT END | | | | | BACK END | | |
|---|---|---|---|---|---|---|---|---|---|---|
| | | | GET | POST | PUT | DELETE | SELECT | INSERT | UPDATE | DELETE |
| VIRTUAL AP SERVER_1 | NUMBER OF REQUESTS/ NUMBER OF COMMANDS | AVERAVE | 443.90 | 243.69 | 148.00 | 176.08 | 134.83 | 276.06 | 228.52 | 384.89 |
| | | STANDARD DEVIATION | 45.46 | 36.29 | 54.88 | 36.15 | 39.58 | 52.85 | 75.93 | 42.15 |
| | AMOUNT OF DATA | AVERAVE | 456.83 | 580.90 | 466.42 | 391.90 | 680.93 | 310.27 | 361.94 | 554.25 |
| | | STANDARD DEVIATION | 109.54 | 64.17 | 123.61 | 46.15 | 46.47 | 36.61 | 39.11 | 35.25 |
| VIRTUAL AP SERVER_2 | NUMBER OF REQUESTS/ NUMBER OF COMMANDS | AVERAVE | 45.07 | 80.78 | 46.74 | 60.47 | 124.84 | 93.64 | 73.80 | 110.98 |
| | | STANDARD DEVIATION | 57.55 | 33.54 | 5.34 | 11.61 | 36.33 | 63.52 | 36.63 | 92.99 |
| | AMOUNT OF DATA | AVERAVE | 11.51 | 6.71 | 1.07 | 2.32 | 7.27 | 12.70 | 7.33 | 18.60 |
| | | STANDARD DEVIATION | 2.30 | 1.34 | 0.21 | 0.46 | 1.45 | 2.54 | 1.47 | 3.72 |
| VIRTUAL AP SERVER_3 | NUMBER OF REQUESTS/ NUMBER OF COMMANDS | AVERAVE | 180.38 | 85.95 | 52.58 | 44.82 | 144.75 | 58.10 | 109.96 | 131.17 |
| | | STANDARD DEVIATION | 34.89 | 45.27 | 75.87 | 39.82 | 24.94 | 56.39 | 56.14 | 78.18 |
| | AMOUNT OF DATA | AVERAVE | 534.91 | 711.93 | 317.80 | 704.97 | 417.12 | 766.55 | 465.24 | 580.01 |
| | | STANDARD DEVIATION | 57.35 | 83.19 | 99.73 | 48.63 | 49.60 | 63.94 | 58.42 | 38.39 |
| ... | | | ... | ... | ... | ... | ... | ... | ... | ... |

FIG. 14

| AP SERVER | | CPU |
|---|---|---|
| VIRTUAL AP SERVER_1 | AVERAVE | 24.5 |
| | STANDARD DEVIATION | 4.12 |
| VIRTUAL AP SERVER_2 | AVERAVE | 46.1 |
| | STANDARD DEVIATION | 6.80 |
| VIRTUAL AP SERVER_3 | AVERAVE | 19.7 |
| | STANDARD DEVIATION | 5.59 |
| ⋮ | ⋮ | ⋮ |

FIG. 17

| CPU | NUMBER OF REQUESTS | | | |
|---|---|---|---|---|
| | GET | POST | PUT | DELETE |
| 1 | 21 | 26 | 21 | 18 |
| ⋮ | ⋮ | ⋮ | ⋮ | ⋮ |
| 10 | 255 | 324 | 261 | 218 |
| ⋮ | ⋮ | ⋮ | ⋮ | ⋮ |
| 20 | 456 | 580 | 466 | 391 |
| ⋮ | ⋮ | ⋮ | ⋮ | ⋮ |
| 50 | 1152 | 1465 | 1177 | 988 |
| ⋮ | ⋮ | ⋮ | ⋮ | ⋮ |
| 100 | 2435 | 3097 | 2488 | 2088 |

FIG. 18

| TIME | AP SERVER_1 |
|---|---|
| | CPU |
| 10:00:01 | 49.16 |
| 10:00:02 | 27.00 |
| 10:00:03 | 52.88 |
| 10:00:04 | 7.01 |
| 10:00:05 | 74.35 |
| ⋮ | ⋮ |

FIG. 20

| TRANSMISSION PATTERN | TIME | REQUEST URI | METHOD | REQUEST PARAMETER |
|---|---|---|---|---|
| TRANSMISSION PATTERN_1 | 10:00:02 | http://xxx.jp/ | POST | xxxx |
| | 10:00:02 | http://xxx.jp/style.css | GET | xxxx |
| | 10:00:02 | http://xxx.jp/main.jc | GET | xxxx |

INFORMATION PROCESSING DEVICE, INFORMATION PROCESSING METHOD, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2017-154219, filed on Aug. 9, 2017, the entire contents of which are incorporated herein by reference.

FIELD

The embodiments discussed herein are related to an information processing device, an information processing method, and a non-transitory computer-readable storage medium.

BACKGROUND

During an operation of a system, a failure often occurs due to a conflict of processes (also referred to as resource load conflict). If a status of a processing load of a device in the system before the failure occurs can be known, it is possible to reproduce the status before the failure occurs in the system in which the failure occurs, by a verification system and to investigate a cause and prepare measures.

As disclosed in Japanese Laid-open Patent Publication No. 2010-224629, when a log of a load of a resource such as a central processing unit (CPU) is usually generated during the operation of the system, it is possible to obtain information on a CPU load before the failure occurs by using the log after the failure occurs. However, when operating a resident process or the like to obtain the log of the CPU load in the system in operation, since the resident process may affect other processes, the resident process is not preferable.

SUMMARY

According to an aspect of the invention, an information processing device including a memory, and a processor coupled to the memory and the processor configured to execute a process, the process including generating data indicating a relationship between a processing load and a communication load of a first computer which executes a specified process in a second information processing system which is the same as or similar to a first information processing system in which a failure occurs, and calculating a processing load of a second computer which executes the specified process in the first information processing system based on the generated data and a communication load of the second computer, the estimated processing load being a processing load before the failure occurs in the first information processing system.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of data stored in a communication load data storage unit;

FIG. 8 is a diagram illustrating an example of data stored in a CPU load data storage unit;

FIG. 10 is a diagram illustrating an example of data stored in a system configuration data storage unit;

FIG. 11 is a diagram illustrating an example of a result of grouping;

FIG. 12 is a diagram illustrating an example of configuration data of a target system;

FIG. 13 is a diagram illustrating an example of statistics of communication loads for each of virtual AP servers;

FIG. 14 is a diagram illustrating an example of statistics of CPU loads for each of the virtual AP servers;

FIG. 17 is a diagram illustrating an example of data stored in a relational data storage unit;

FIG. 18 is a diagram illustrating an example of data stored in an estimation data storage unit;

FIG. 20 is a diagram illustrating an example of a transmission pattern.

DESCRIPTION OF EMBODIMENTS

One aspect is to estimate a CPU load of a device in a system before a failure occurs.

Figure 1:
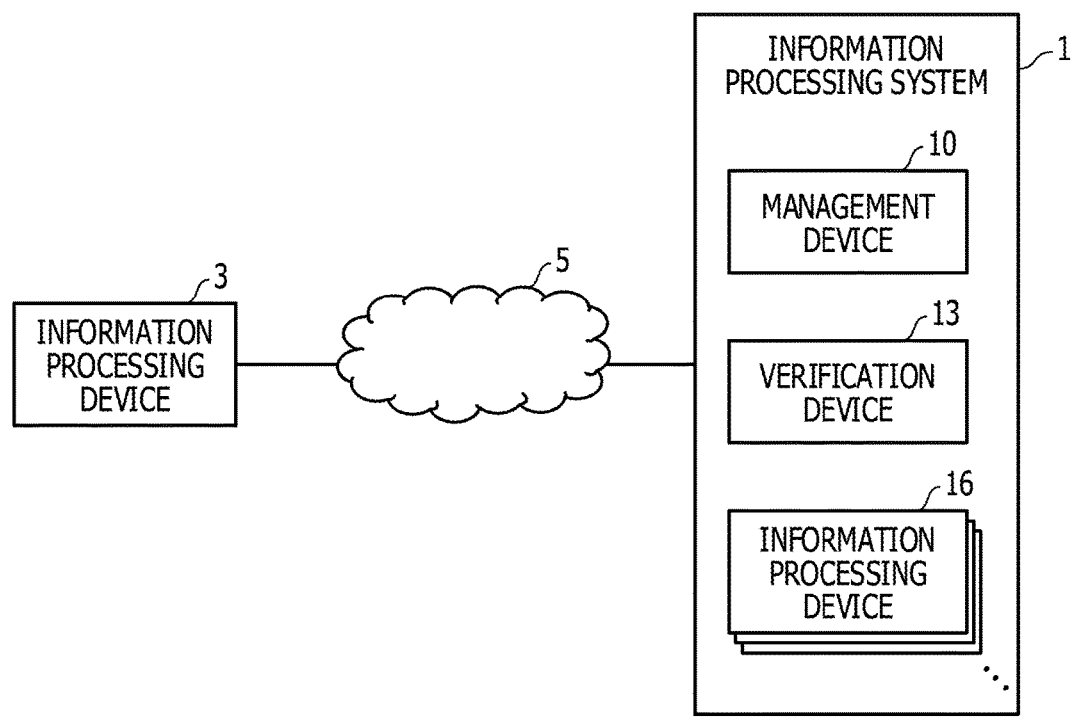
FIG. 1 is a diagram illustrating an outline of a system according to the present embodiment.

FIG. 1 is a diagram illustrating an outline of a system according to the present embodiment. An information processing system 1 includes a management device 10 which executes a main process of the present embodiment, a verification device 13 which operates a verification system, and one or a plurality of information processing devices 16 which operate a system used, for example, by a client. The information processing system 1 is connected to a network 5 which is a network such as a local area network (LAN) or the Internet.

An information processing device 3 is connected to the network 5. In the present embodiment, it is assumed that a failure occurs in the system operated by the information processing device 3. The failure is, for example, an abnormality in application software executed by a virtual application (AP) server in the system.

Figure 2:
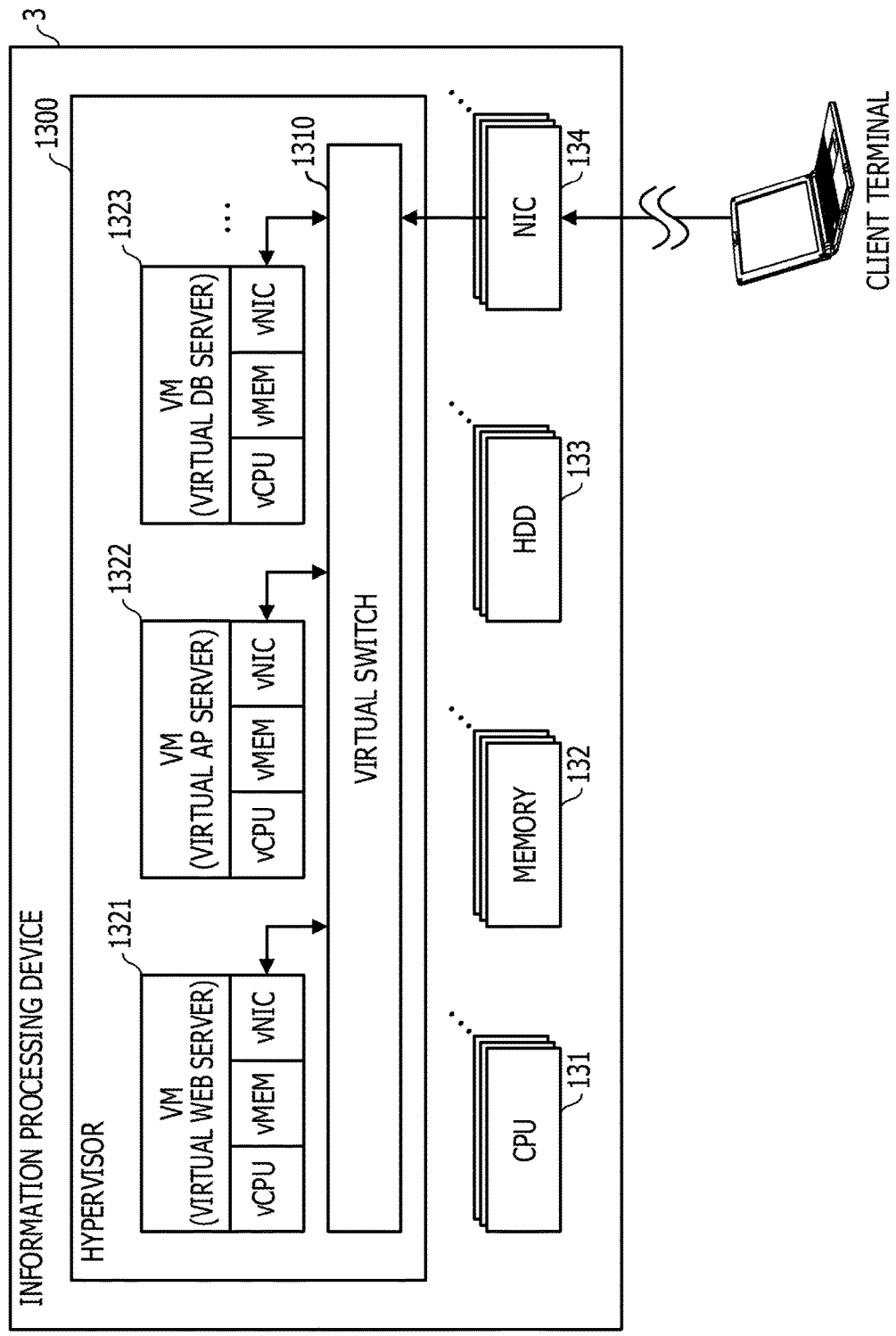
FIG. 2 is a configuration diagram of an information processing device.

FIG. 2 is a configuration diagram of the information processing device 3. The information processing device 3 includes one or a plurality of CPUs 131, one or a plurality of memories 132, one or a plurality of hard disk drives (HDDs) 133, and one or a plurality of network interface cards (NIC) 134 as hardware components.

A hypervisor 1300 which is virtualization software is realized, for example, by a program loaded into the memory 132 being executed in the CPU 131. The hypervisor 1300 realizes a virtual switch 1310 and virtual machines (VMs) 1321 to 1323 which include a virtual CPU (vCPU in FIG. 2), a virtual memory (vMEM in FIG. 2) and a virtual NIC (vNIC in FIG. 2). In the present embodiment, the VM 1321 is a virtual WEB server, the VM 1322 is a virtual AP server, and the VM 1323 is a virtual database (DB) server.

The information processing device 3 receives a request from a client terminal and transmits the received request to the virtual NIC of the VM 1321 which is the virtual WEB server by the virtual switch 1310. The VM 1321 transmits a processing request to the VM 1322 which is the virtual AP server according to contents of the request. The VM 1322 transmits a data request to the VM 1323 which is the virtual DB server according to contents of the processing request. In the present embodiment, as a communication load of the system realized in the information processing device 3, the number of hyper text transfer protocol (HTTP) requests received by the virtual AP server and the number of commands of each of structured query language (SQL) are used. In addition, as a processing load of the system realized in the information processing device 3, a load of the virtual CPU of the virtual AP server is used.

In FIG. 2, the number of VMs is three, but the VMs equal to or more than four may be executed. In addition, in FIG. 2, the system which includes one virtual WEB server, one virtual AP server, and one virtual DB server is realized, but the system which includes another configuration may be realized. For example, a VM which includes both of functions of the WEB server and the AP server may be executed. In addition, the system is realized so as to include the virtual WEB server and the virtual AP server without the virtual DB server. Further, the VMs equal to or more than two realize one function (for example, function of WEB server). In addition, for example, the VM which includes functions such as a firewall, a load distribution device, an active directory (AD) server, a list server may be executed.

Figure 3:
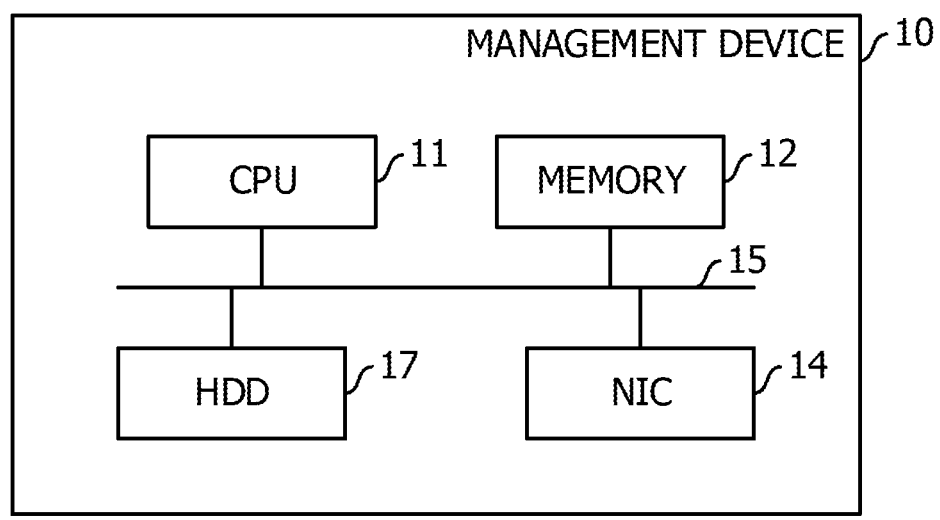
FIG. 3 is a hardware configuration diagram of a management device.

FIG. 3 is a hardware configuration diagram of a management device 10. The management device 10 includes a CPU 11, a memory 12, an HDD 17, and an NIC 14 as hardware components. Each of the hardware components is connected with one another via a bus 15. The management device 10 may include another hardware component.

Figure 4:
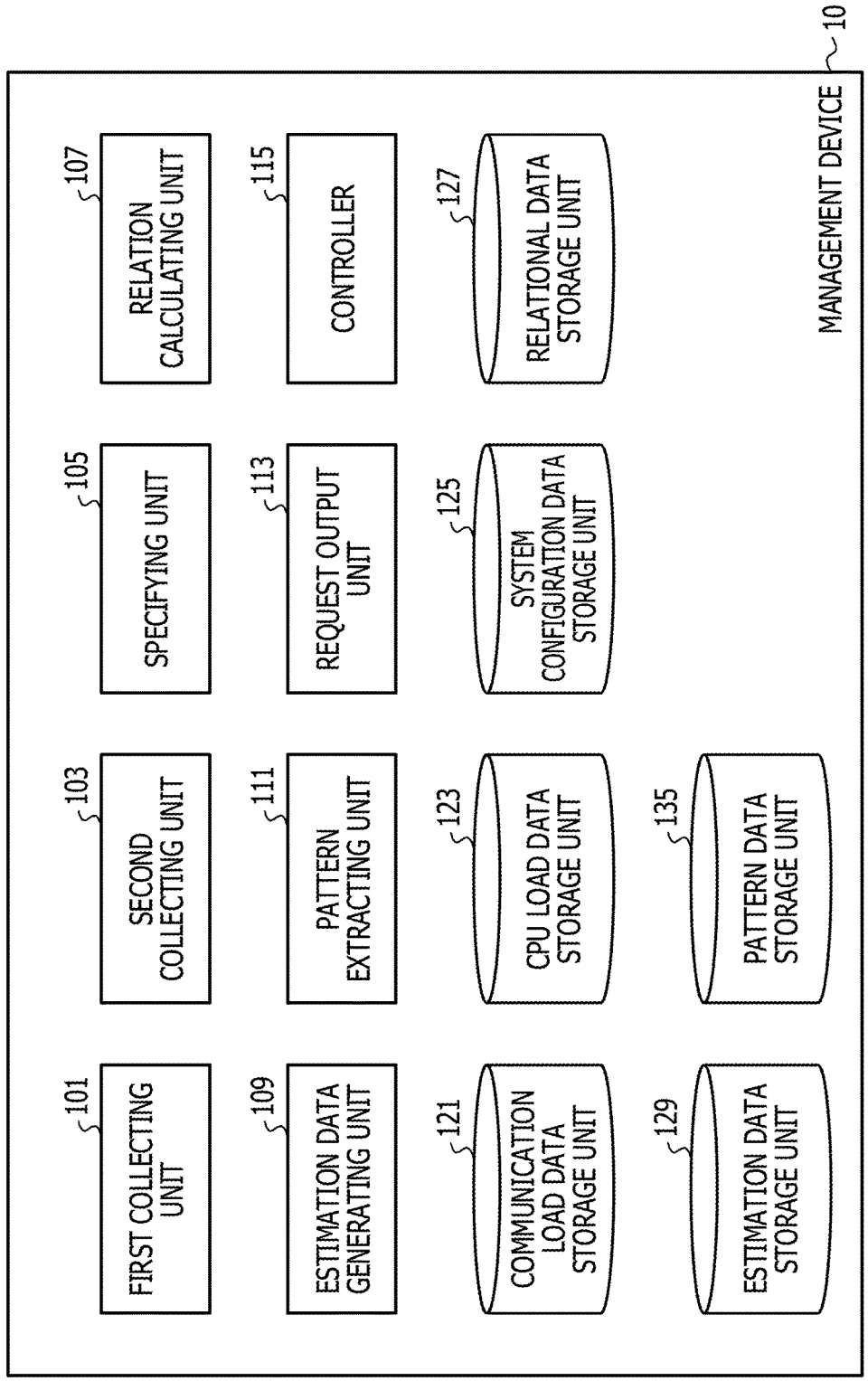
FIG. 4 is a functional block diagram of the management device.

FIG. 4 is a functional block diagram of the management device 10. The management device 10 includes a first collecting unit 101, a second collecting unit 103, a specifying unit 105, a relation calculating unit 107, a estimation data generating unit 109, a pattern extracting unit 111, a request output unit 113, a controller 115, a communication load data storage unit 121, a CPU load data storage unit 123, a system configuration data storage unit 125, a relational data storage unit 127, an estimation data storage unit 129, and a pattern data storage unit 135.

A program of causing the management device 10 to execute a process is stored, for example, in the HDD 17. The program is loaded into the memory 12 and executed by the CPU 11 so that the first collecting unit 101, the second collecting unit 103, the specifying unit 105, the relation calculating unit 107, the estimation data generating unit 109, the pattern extracting unit 111, the request output unit 113, and the controller 115 illustrated in FIG. 4 are realized. For example, the communication load data storage unit 121, the CPU load data storage unit 123, the system configuration data storage unit 125, the relational data storage unit 127, the estimation data storage unit 129, and the pattern data storage unit 135 are provided in the memory 12 or the HDD 17.

The first collecting unit 101 generates data of the communication load based on a communication log received from the information processing device 3, the verification device 13, and the information processing device 16 and stores the generated data of the communication load in the communication load data storage unit 121. The second collecting unit 103 stores data of the CPU load received from the information processing device 3, the verification device 13, and the information processing device 16 in the CPU load data storage unit 123. The specifying unit 105 executes a process based on the data stored in the communication load data storage unit 121, the data stored in the CPU load data storage unit 123, and data stored in the system configuration data storage unit 125 and notifies the relation calculating unit 107 of a processing result. The relation calculating unit 107 executes a process based on the processing result notified from the specifying unit 105, and the data stored in the communication load data storage unit 121 and the data stored in the CPU load data storage unit 123 and stores a processing result in the relational data storage unit 127. The estimation data generating unit 109 executes a process based on the data stored in the communication load data storage unit 121 and the data stored in the relational data storage unit 127 and stores a processing result in the estimation data storage unit 129.

The pattern extracting unit 111 executes a process based on the data stored in the communication load data storage unit 121 and stores a processing result in the pattern data storage unit 135. The request output unit 113 executes a process of outputting the HTTP request to the verification device 13 based on the data stored in the relational data storage unit 127, the data stored in the estimation data storage unit 129, and the data stored in the pattern data storage unit 135. The controller 115 executes a process based on the data stored in the CPU load data storage unit 123 and the data stored in the estimation data storage unit 129 and changes a transmission frequency of the HTTP request output to the verification device 13 by the request output unit 113 according to a processing result.

Next, the process executed by the management device 10 will be described in detail.

Figure 5:
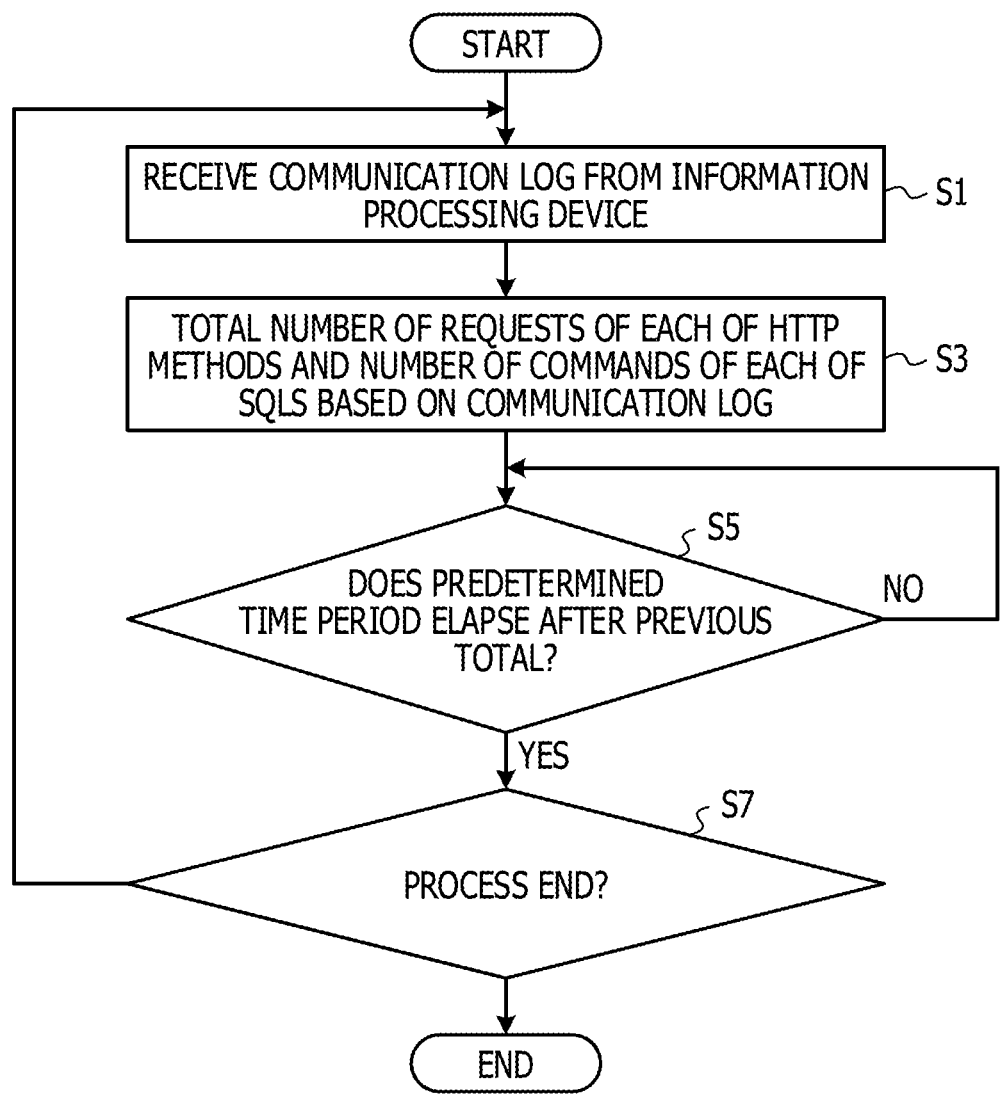
FIG. 5 is a diagram illustrating a flow of a process executed by a first collecting unit of the management device.

FIG. 5 is a diagram illustrating a flow of the process executed by the first collecting unit 101 of the management device 10.

The first collecting unit 101 receives the communication log from the information processing device 3 during a predetermined time period (for example, 1 second) (step S1 in FIG. 5). The communication log includes time information, a uniform resource identifier (URI), HTTP method information, a request parameter, and other information.

Based on the communication log received in step S1, the first collecting unit 101 totals the number of requests of each of HTTP methods and the number of commands of each of SQLs (step S3). Then, the first collecting unit 101 stores a result of totaling in the communication load data storage unit 121

FIG. 6 is a diagram illustrating an example of the data stored in the communication load data storage unit 121. In the example in FIG. 6, the time information, the number of requests of each of the HTTP methods (here, number of requests per 1 second) and the amount of data (here, amount of data (kilobyte) per 1 second), and the number of commands of each of SQLs and the amount of data are stored.

The first collecting unit 101 determines whether or not a predetermined time period elapses after step S3 is executed (step S5). In a case where the predetermined time period does not elapse (No in step S5), the process is returned to step S5.

On the other hand, in a case where the predetermined time period elapses (Yes in step S5), the first collecting unit 101 determines whether or not there is an instruction to terminate the process (step S7). In a case where there is no instruction to terminate the process (No in step S7), the process is returned to step S1. On the other hand, in a case where there is the instruction to terminate the process (Yes in step S7), the process is terminated.

According to the process described above, the management device 10 can manage the data of the communication load of the information processing device 3. In the same manner, the management device 10 can obtain the data of the communication loads of not only the information processing device 3 but also the verification device 13 and the information processing device 16.

Figure 7:
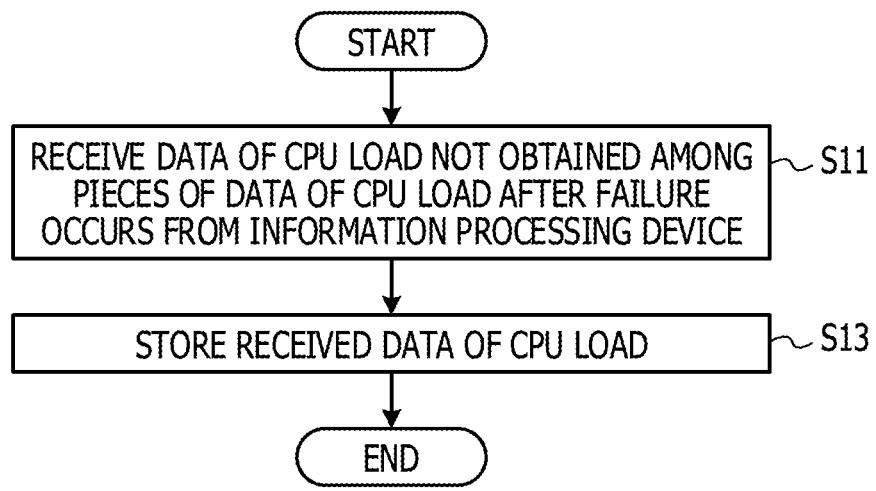
FIG. 7 is a diagram illustrating a flow of a process executed by a second collecting unit of the management device.

FIG. 7 is a diagram illustrating a flow of a process executed by the second collecting unit 103 of the management device 10.

In the present embodiment, in order not to affect the other processes executed by the VM 1322 which is a virtual AP server on the information processing device 3, the CPU load (specifically, CPU use rate) of the VM 1322 is measured only after a failure occurs. After the failure occurs in the information processing device 3, the management device 10 obtains the data of the CPU load from the information processing device 3. Therefore, for example, the process illustrated in FIG. 7 is executed periodically after the failure occurs.

The second collecting unit 103 receives the data of the CPU load which is not obtained (specifically, data of CPU load measured after the previous data of CPU load is obtained) among pieces of the data of the CPU load after the failure occurs in the information processing device 3, from the information processing device 3 (step S11 in FIG. 7).

The second collecting unit 103 stores the data of the CPU load received in step S11 in the CPU load data storage unit 123 (step S13). Thus, the process is terminated.

FIG. 8 is a diagram illustrating an example of the data stored in the CPU load data storage unit 123. In the example in FIG. 8, the time information and information on the CPU load (unit is %) of each of physical CPUs actually used by the virtual AP server as the virtual CPU are stored.

According to the process described above, the management device 10 can manage the data of the CPU load of the information processing device 3. In the same manner, the management device 10 can obtain the data of the communication load of not only the information processing device 3 but also the information processing device 16. In order to reproduce the CPU load for the verification device 13, the load data of the CPU in operation is usually obtained.

Figure 9:
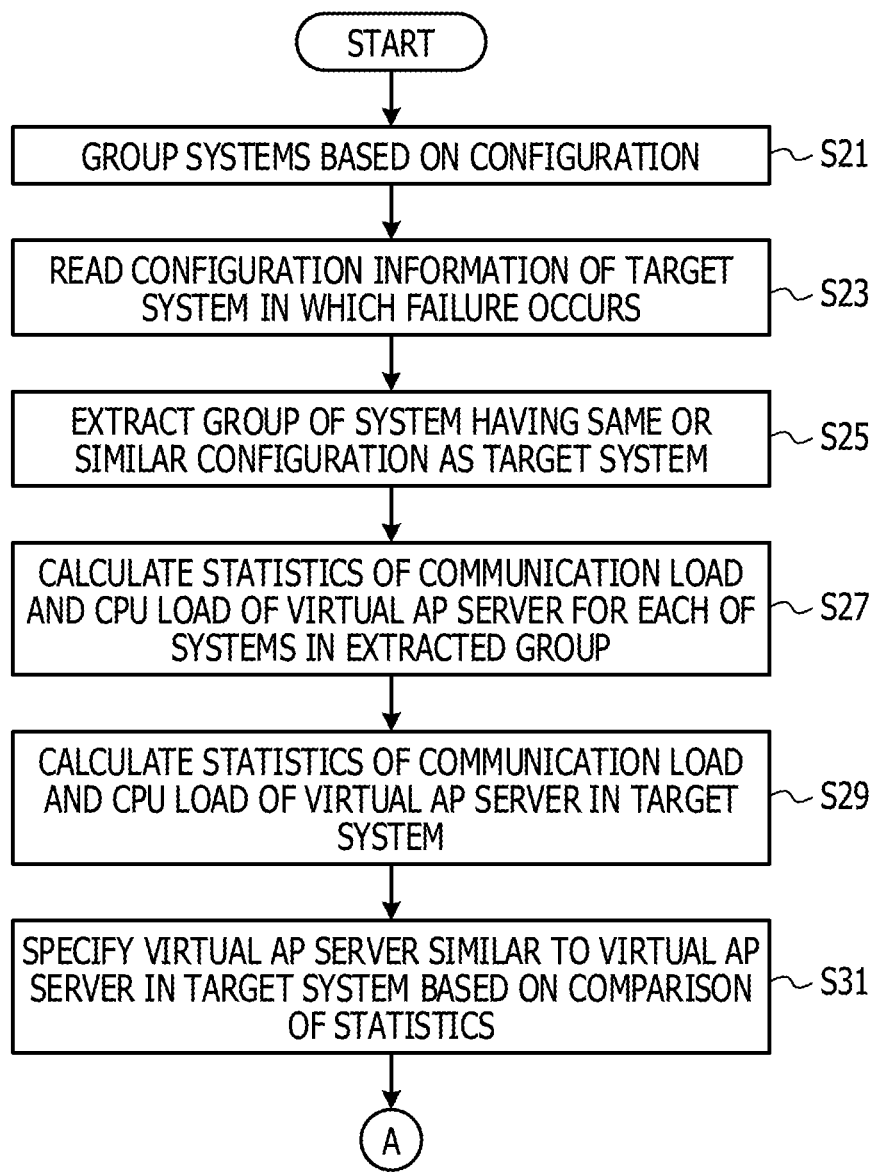
FIG. 9 is a diagram illustrating a flow of a process of estimating a CPU load before a failure occurs.

FIG. 9 is a diagram illustrating a flow of a process of estimating the CPU load before a failure occurs.

First, by using the data stored in the system configuration data storage unit 125, the specifying unit 105 groups a plurality of systems realized on the information processing device 16 based on a system configuration (step S21 in FIG. 9).

FIG. 10 is a diagram illustrating an example of the data stored in the system configuration data storage unit 125. In the example in FIG. 10, information on a system name, a type of the server, the number of CPU cores, a memory capacity (unit is gigabyte) is stored.

In step S21, the specifying unit 105 groups the systems so that the system which has the same system configuration belongs to the same group. FIG. 11 is a diagram illustrating an example of a result of the grouping. In the example in FIG. 11, the system configuration belonging to "group_1" is "LB+Cache+three layers Web+Storage", the system configuration belonging to "group_2" is "two layers Web", and the system configuration belonging to "group_3" is "LB+App".

The specifying unit 105 reads configuration data of the system (in present embodiment, system realized on information processing device 3, hereinafter, referred to as "target system") in which the failure occurs from the system configuration data storage unit 125 (step S23).

FIG. 12 is a diagram illustrating an example of the configuration data of the target system. In the example in FIG. 12, the target system configuration is "LB+Cache+three layers Web+Storage".

The specifying unit 105 extracts a group of the systems having the same or similar configuration as the target system based on the configuration data read in step S23 and a result of the grouping in step S21 (step S25).

For example, in a case where the configuration data of the target system is the configuration data illustrated in FIG. 12 and the result of the grouping is the result illustrated in FIG. 11, "group_1" is extracted.

The specifying unit 105 calculates statistics of the communication load and statistics of the CPU load of the virtual AP server for each of the systems in the group extracted in step S25 by using the data stored in the communication load data storage unit 121 and the data stored in the CPU load data storage unit 123 (step S27). In the present embodiment, the statistics are an average and a standard deviation, but other statistics may be used.

FIG. 13 is a diagram illustrating an example of statistics of the communication loads for each of the virtual AP servers. In the example in FIG. 13, statistics of the number of requests of each of the HTTP methods and the amount of data, and statistics of the number of commands of each of SQLs and the amount of data are calculated for each of the virtual AP servers. The number of requests is the number of requests per second and a unit of the amount of data is kilobytes/second.

FIG. 14 is a diagram illustrating an example of statistics of the CPU loads for each of the virtual AP servers. In the example in FIG. 14, the statistics of the CPU loads are calculated for each of the virtual AP servers and the statistics of the CPU loads correspond to an average of statistics of the CPU load (%) of each of the physical CPUs.

The specifying unit 105 calculates statistics of the communication load and statistics of the CPU load of the virtual AP server in the target system by using the data stored in the communication load data storage unit 121 and the data stored in the CPU load data storage unit 123 (step S29). In step S29, statistics for the same items as those in step S27 are calculated. Specifically, an average and a standard deviation of the number of requests of each of the HTTP methods and the amount of data, and an average and a standard deviation of the number of commands of each of SQLs and the amount of data are calculated.

Based on comparison of the statistics calculated in step S27 with the statistics calculated in step S29, the specifying unit 105 specifies the virtual AP server similar to the virtual AP server in the target system (step S31). Then, the process is moved to step S33 in FIG. 15 via a terminal A.

For example, in step S31, the specifying unit 105 specifies the virtual AP server having the smallest sum (that is, highest similarity) of a total of differences of the statistics for each of the items of the communication load and a total of differences of the statistics for each of the items of the CPU load is specified or the sum equal to or more than a predetermined value.

Figure 15:
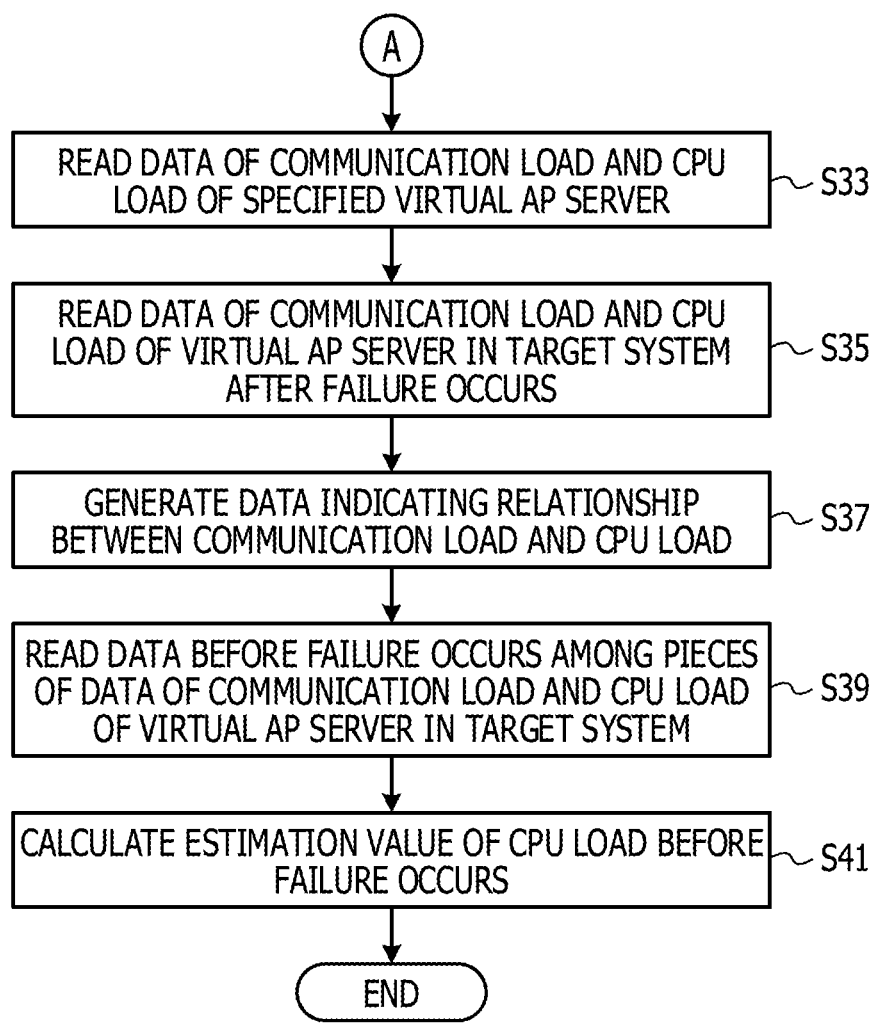
FIG. 15 is a diagram illustrating a flow of the process of estimating the CPU load before the failure occurs.

As described in FIG. 15, the specifying unit 105 notifies the relation calculating unit 107 of a processing result of step S31. Then, the relation calculating unit 107 reads the data of the communication load of the virtual AP server specified in step S31 from the communication load data storage unit 121 and reads the data of the CPU load of the virtual AP server specified in step S31 from the CPU load data storage unit 123 (step S33). In step S33, the number of requests of each of the HTTP methods is read and the number of commands of SQLs is not read as the data of the communication load.

The relation calculating unit 107 reads the data of the communication load of the virtual AP server in the target system after a failure occurs, from the communication load data storage unit 121. In addition, the relation calculating unit 107 reads the data of the CPU load of the virtual AP server in the target system after the failure occurs, from the CPU load data storage unit 123 (step S35). In step S35, the number of requests of each of the HTTP methods is read and the number of commands of SQLs is not read as the data of the communication load.

Based on the data read in step S33 and the data read in step S35, the relation calculating unit 107 generates data which indicates a relationship between the communication load and the CPU load (step S37). The relation calculating unit 107 stores the data which indicates the calculated relation, in the relational data storage unit 127. In step S37, for example, a regression analysis is executed and data which indicates the relationship between the CPU load and the communication load is generated based on a result of the regression analysis. As the CPU load data, an average of the CPU loads of each of the physical CPUs is used.

Figure 16:
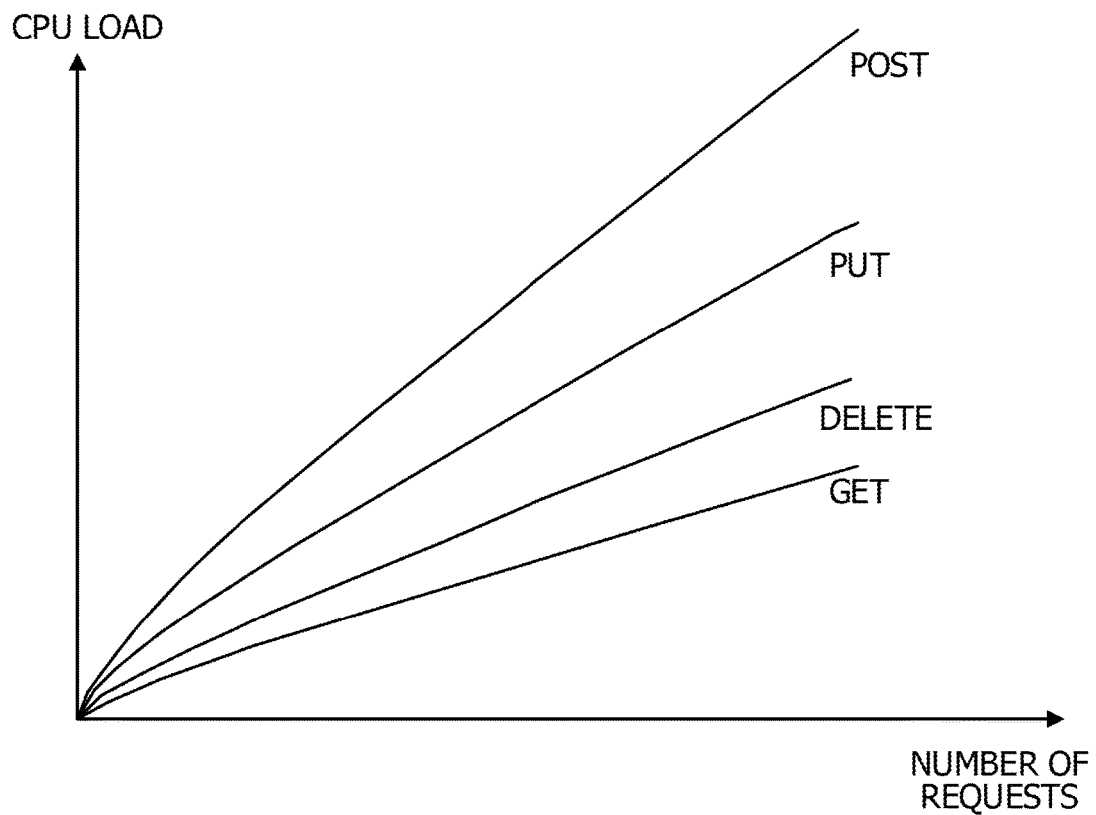
FIG. 16 is a diagram illustrating a relationship between the CPU load and the number of requests of each of HTTP methods.

FIG. 16 is a diagram illustrating a relationship between the CPU load and the number of requests of each of the HTTP methods. As illustrated in FIG. 16, normally, as the number of HTTP requests received by the virtual AP server increases, the CPU load (that is, CPU use rate) increases. Accordingly, it is possible to estimate the CPU load from the number of HTTP requests of each of the methods.

FIG. 17 is a diagram illustrating an example of the data stored in the relational data storage unit 127. In the example in FIG. 17, the number of requests of each of the methods (here, number of requests per second) is stored in association with each of the CPU loads. For example, when the number of "GET" methods is 255 and the number of HTTP requests of other methods is 0, the CPU load is 10 (%). In addition, when the number of "GET" methods is 255, the number of "POST" methods is 324, the number of "PUT" methods is 261, and the number of "DELETE" methods is 218, the CPU load is estimated to be 40 (%).

The estimation data generating unit 109 reads the data before the failure occurs among pieces of the data of the communication load of the virtual AP server in the target system, from the communication load data storage unit 121 (step S39).

Based on the data read in step S39 and the data stored in the relational data storage unit 127, the estimation data generating unit 109 calculates an estimation value of the CPU load before the failure occurs (step S41). The estimation data generating unit 109 stores the calculated estimation value in the estimation data storage unit 129. Thus, the process is terminated. In step S41, for each of times before the failure occurs, the CPU load corresponding to the number of requests of each of the methods indicated by the read data of the communication load is calculated based on the data stored in the relational data storage unit 127 and a total of the calculated CPU loads is calculated. When the total of the CPU loads exceeds 100 (%), the total is set to 100 (%).

FIG. 18 is a diagram illustrating an example of the data stored in the estimation data storage unit 129. In the example in FIG. 18, the estimation value of the CPU load of the virtual AP server specified in step S31 is stored for each of times before the failure occurs.

As described above, by using the relationship between the CPU load and the communication load, even in a case where the CPU load before a failure occurs is not measured, it is possible to estimate the CPU load before the failure occurs. Accordingly, since it is not desirable to operate a resident process or the like for monitoring the CPU load, it is possible to assign more CPU resources to other processes.

In addition, according to the present embodiment, since the communication load before the failure occurs (that is, load of virtual network input/output (IO)) is considered, the estimation value of the CPU load of the virtual AP server can be set to a more appropriate value.

Figure 19:
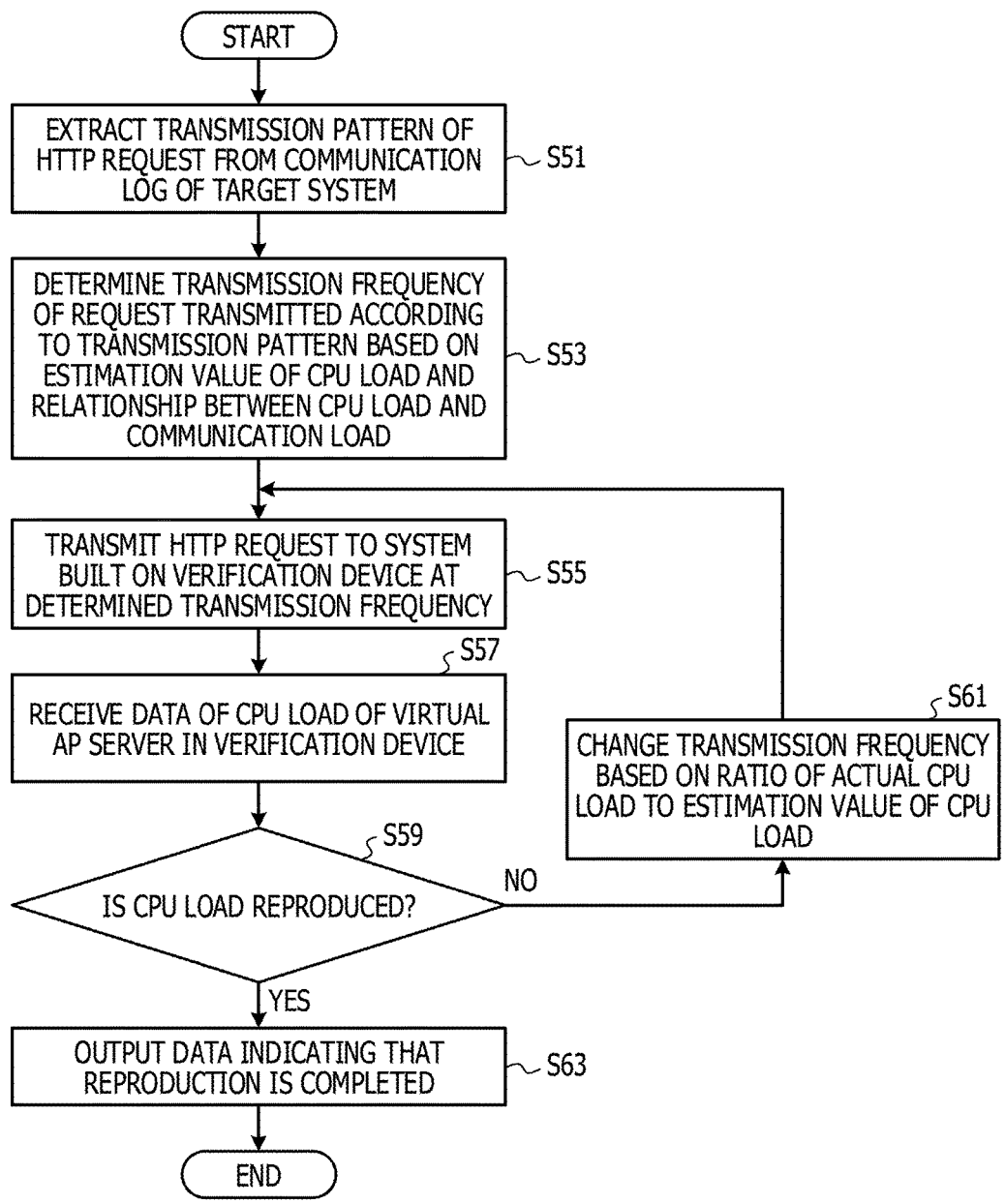
FIG. 19 is a diagram illustrating a flow of a process of reproducing the CPU load before a failure occurs.

FIG. 19 is a diagram illustrating a flow of a process of reproducing the CPU load before a failure occurs by the verification device 13. The process is executed, for example, after the estimation value of the CPU load is calculated. In addition, a system which has the same configuration as the system which includes the virtual AP server specified in step S31, is virtually built in the verification device 13.

The pattern extracting unit 111 extracts one or a plurality of transmission patterns of the HTTP request from the communication log (here, communication log before failure occurs) which the first collecting unit 101 receives from the information processing device 3 (step S51 in FIG. 19).

FIG. 20 is a diagram illustrating an example of the transmission pattern. In the example of FIG. 20, a transmission pattern_1 which includes an HTTP request of POST transmitted at 10:00:02, an HTTP request of GET transmitted at 10:00:03, an HTTP request of GET transmitted at 10:00:05 is illustrated. In the present embodiment, for example, a series of HTTP requests received within a predetermined time period (for example, 10 seconds) is handled as one transmission pattern.

The request output unit 113 determines the transmission frequency of the request transmitted according to the transmission pattern extracted in step S51 based on the estimation value stored in the estimation data storage unit 129 and the data stored in the relational data storage unit 127 (step S53).

As an example, a method of determining the transmission frequency in a case of obtaining the transmission pattern which includes the three HTTP requests illustrated in FIG. 20 is described. In this case, for example, as illustrated in FIG. 18, when reproducing the CPU load of 27.00% at 10:00:02, the HTTP request is transmitted so that the CPU load corresponding to POST becomes 9% (=27/3*1) and the CPU load corresponding to GET becomes 18% (=27/3*2). When the number of HTTP requests determined based on the data (for example, data illustrated in FIG. 17) stored in the relational data storage unit 127 is 290 for POST and is 410 for GET, at the time corresponding to 10:00:02, the HTTP request of POST is transmitted 290 times and the HTTP request of GET is transmitted 410 times. By executing the same process on each of times after 10:00:03, it is possible to determine the transmission frequency at the time corresponding to each of times for a period before the failure occurs. The request URI and the parameter of the HTTP request are appropriately changed.

In addition, for example, in a case where the transmission pattern other than the transmission pattern illustrated in FIG. 20 is extracted at 11:00:00, after the time corresponding to 11:00:00, the HTTP request is transmitted with the transmission pattern extracted at 11:00:00.

The method described here is an example, and the method may be changed according to contents of the transmission pattern to be extracted and the number of the transmission patterns to be extracted.

Returning to the description of FIG. 18, the request output unit 113 transmits the HTTP request to the system built on the verification device 13 at the transmission frequency determined in step S53 (step S55). While the HTTP request is transmitted from the request output unit 113, the verification device 13 measures the CPU load of the virtual AP server in the system.

The request output unit 113 instructs the second collecting unit 103 to receive the data of the CPU load. In response to this, the second collecting unit 103 receives the data of the CPU load of the virtual AP server of the system built on the verification device 13, from the verification device 13 (step S57) and stores the received data in the CPU load data storage unit 123.

The controller 115 compares the estimation value stored in the estimation data storage unit 129 with the data of the CPU load received in step S57 and determines whether or not the CPU load before a failure occurs is reproduced in the system on the verification device 13 (step S59).

In a case where the CPU load before the failure occurs is not reproduced in the system on the verification device 13 (No in step S59), the controller 115 executes the following process. Specifically, the controller 115 changes the transmission frequency of the request transmitted by the request output unit 113 based on comparison between the estimation value of the CPU load and the actual CPU load (that is, data of CPU load received in step S57) (step S61). Then, the process is returned to step S55.

For example, in a case where the actual CPU load is 25 (%) while the estimation value of the CPU load at a certain time is 20 (%), the transmission frequency is changed to 80 (=20/25*100) (%) of the current so that the CPU load decreases from 25 (%) to 20 (%). By performing such a process at each of times, the estimated CPU load is reproduced in the system on the verification device 13.

On the other hand, the CPU load before the failure occurs is reproduced in the system on the verification device 13 (Yes in step S59), the controller 115 outputs data indicating that the reproduction is completed, to a display device (for example, display) of the management device 10 (step S63). Thus, the process is terminated.

According to the process described above, it is possible to reproduce the status before the failure occurs. As a result, it is possible to investigate a cause of the failure and to prepare measures against the failure. In the related art, since the load is randomly applied, it is difficult to investigate the cause of the failure and to prepare measures against the failure, and it takes time even if it is assumed that it is possible to investigate the cause of the failure and to prepare measures against the failure. However, according to the method of the present embodiment, it becomes easier to investigate the cause of the failure and to prepare measures against the failure.

Although one embodiment of the present disclosure is described above, the present disclosure is not limited thereto. For example, in some cases, the functional block configuration of the management device 10 described above may not match the actual program module configuration.

In addition, the configuration of each of tables described above is only an example, and it is not desirable to have the configuration described above. Further, also in the flow of the processes, if the processing result does not change, it is also possible to change the order of the processes. In addition, the processes may be executed in parallel.

In step S37, the data of the communication load and the data of the CPU load of the virtual AP server of the target system may not be used, in this case, the process in step S35 may be skipped.

The management device 10 may hold the data of the communication load and the data of the CPU load of the system realized on the information processing device 16, in advance. Then, the management device 10 may execute the process or the like in step S31 by using the held data of the communication load and the held data of the CPU load.

In a case of extracting the virtual AP server of the system similar to the virtual AP server of the target system, a time series value itself may be compared instead of the statistics. In addition, the similar virtual AP server may be extracted by obtaining a plurality of the same type statistics during the period and comparing the plurality of statistics. The period used for the comparison is, for example, the same, but may not be the same.

In a case of extracting the virtual AP server of the system similar to the virtual AP server of the target system, the number of commands of SQLs may not be used.

The present embodiment may be applied to a server, which is a server other than the virtual AP server, having the CPU load which fluctuates according to the communication load.

In a case of calculating the relationship between the communication load and the CPU load for each of the physical CPUs, the estimation value may be calculated for each of the physical CPUs.

In a case where the system, in which the similar virtual AP server operates, is stopped, the CPU load may be reproduced by using the system instead of the system on the verification device 13.

The embodiment described above of the present disclosure can be summarized as follows.

An information processing device according to a first aspect of the present embodiment includes (A) a first generating unit (relation calculating unit 107 of embodiment is example of first generating unit) configured to generate data indicating a relationship between a processor load and a communication load of a first device which executes a process in a second system which is the same or similar system as a first system in which a failure occurs; and (B) a calculating unit (estimation data generating unit 109 of embodiment is example of calculating unit) configured to calculate a processor load of a second device before the failure occurs based on the generated data and a communication load of the second device which executes the process in the first system before the failure occurs.

Even if information on the processor load of the second device before the failure occurs may not be obtained, when information on the communication load can be obtained, it is possible to estimate the processor load before the failure occurs.

In addition, the first generating unit (a1) may specify the second system based on comparison between a configuration of the first system and a variation in the processor load and a variation in the communication load of the second device, and a configuration of a system other than the first system and a variation in the processor load and a variation in the communication load of a device which executes the specific process in the system.

It is possible to specify the second system appropriate for estimating the processor load of the second device in the first system.

In addition, the first generating unit (a2) may generate data indicating a relationship between the processor load of the first device and the number of requests to the first device for each of types of the requests to the first device.

Since characteristics of variation in the processor load are changed according to the type of the request, by executing the process described above, the calculated processor load can be set to a more appropriate value.

In addition, the information processing device may further include (C) a second generating unit (pattern extracting unit 111 of embodiment is example of second generating unit) configured to generate a transmission pattern of requests to the second device before the failure occurs from a communication log of the second device before the failure occurs; (D) an output unit (request output unit 113 of embodiment is example of output unit) configured to transmit the request to the first device according to the generated transmission pattern; (E) and a controller (controller 115 of embodiment is example of controller) configured to change a frequency at which the output unit transmits the request to the first device based on a result obtained by comparing the processor load of the first device in a case where the request is transmitted to the first device according to the generated transmission pattern with the calculated processor load of the second device.

Since it is possible to generate the processor load in the first device while considering the processor load which occurs in the second device, it is possible to investigate the cause of the failure by reproducing the status before the failure.

In addition, the controller (e1) may change the frequency at which the output unit transmits the request to the first device so that the measured processor load matches the calculated processor load of the second device.

Further, the first device and the second device may be virtual machines.

An information processing method according to a second aspect of the present embodiment includes (F) generating data indicating a relationship between a processor load and a communication load of a first device which executes a process in a second system which is the same or similar system as a first system in which a failure occurs; and (G) calculating a processor load of a second device before the failure occurs based on the generated data and a communication load of the second device which executes the process in the first system before the failure occurs.

It is possible to prepare a program for causing a processor to perform the process according to the method described above. The program is stored in a computer-readable storage medium or a storage device such as a flexible disk, a CD-ROM, a magneto-optical disk, a semiconductor memory, a hard disk, or the like. The intermediate processing result is temporarily stored in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
   a memory; and
   a processor coupled to the memory and the processor configured to execute a process, the process including:
      generating data indicating a relationship between a processing load and a communication load of a first device which executes a specified process in a second information processing system which is the same as or similar to a first information processing system in which a failure occurs;
      calculating a processing load of a second device which executes the specified process in the first information processing system based on the generated data and a communication load of the second device, the calculated processing load being a processing load before the failure occurs in the first information processing system;
      specifying the second information processing system from a plurality of information processing systems based on a first result of a first comparison between a configuration of the first information processing system and a configuration of each of the plurality of information processing systems, a second result of a second comparison between a variation in the processing load of the second device and a variation in a processing load of each of the plurality of information processing systems, and a third result of a third comparison between a variation in the communication load of the second device and a variation in a communication load of each of the plurality of information processing systems; and
      controlling a transmission frequency of requests based on the calculated processing load and the relationship between a processing load and a communication load of the first device in a case where the request is transmitted to the first device.

2. The information processing device according to claim 1, wherein the generating generates data indicating a relationship between the processor load of the first device and a number of requests to the first device for each of request types.

3. The information processing device according to claim 1, wherein the process further comprises:
   generating a transmission pattern of the requests to the second device before the failure occurs, based on a communication log of the second device before the failure occurs;
   transmitting the request to the first device in accordance with the generated transmission pattern; and
   controlling a transmission frequency of the requests based on a fourth result of a comparison between the calculated processing load of the second device and a processing load of the first device in a case where the request is transmitted to the first device in accordance with the generated transmission pattern.

4. The information processing device according to claim 3, wherein the controlling changes the transmission frequency so that the processing load of the first device in a case where the request is transmitted to the first device become close to the calculated processing load of the second device.

5. The information processing device according to claim 1, wherein the first device and the second device are virtual machines.

6. An information processing method executed by a computer, the information processing method comprising:
generating data indicating a relationship between a processing load and a communication load of a first computer which executes a specified process in a second information processing system which is the same as or similar to a first information processing system in which a failure occurs;
calculating a processing load of a second computer which executes the specified process in the first information processing system based on the generated data and a communication load of the second computer, the calculated processing load being a processing load before the failure occurs in the first information processing system;
specifying the second information processing system from a plurality of information processing systems based on a first result of a first comparison between a configuration of the first information processing system and a configuration of each of the plurality of information processing systems, a second result of a second comparison between a variation in the processing load of the second computer and a variation in a processing load of each of the plurality of information processing systems, and a third result of a third comparison between a variation in the communication load of the second computer and a variation in a communication load of each of the plurality of information processing systems; and
controlling a transmission frequency of requests based on the calculated processing load and the relationship between a processing load and a communication load of the first computer in a case where the request is transmitted to the first computer.

7. A non-transitory computer-readable storage medium storing a program that causes a computer to execute a process, the process comprising:
generating data indicating a relationship between a processing load and a communication load of a first computer which executes a specified process in a second information processing system which is the same as or similar to a first information processing system in which a failure occurs;
calculating a processing load of a second computer which executes the specified process in the first information processing system based on the generated data and a communication load of the second computer, the calculated processing load being a processing load before the failure occurs in the first information processing system;
specifying the second information processing system from a plurality of information processing systems based on a first result of a first comparison between a configuration of the first information processing system and a configuration of each of the plurality of information processing systems, a second result of a second comparison between a variation in the processing load of the second computer and a variation in a processing load of each of the plurality of information processing systems, and a third result of a third comparison between a variation in the communication load of the second computer and a variation in a communication load of each of the plurality of information processing systems; and
controlling a transmission frequency of requests based on the calculated processing load and the relationship between a processing load and a communication load of the first computer in a case where the request is transmitted to the first computer.

* * * * *